United States Patent
Kamata et al.

(10) Patent No.: US 9,914,861 B2
(45) Date of Patent: Mar. 13, 2018

(54) MICROCAPSULE TYPE CURABLE RESIN COMPOSITION

(71) Applicant: THREEBOND CO., LTD., Hachiouji-shi, Tokyo (JP)

(72) Inventors: Kunihiko Kamata, Hachioji (JP); Kenji Kuboyama, Hachioji (JP)

(73) Assignee: THREEBOND CO., LTD., Tokyo (JP)

( * ) Notice: Subject to any disclaimer, the term of this patent is extended or adjusted under 35 U.S.C. 154(b) by 0 days.

(21) Appl. No.: 15/032,140

(22) PCT Filed: Oct. 8, 2014

(86) PCT No.: PCT/JP2014/077001
§ 371 (c)(1),
(2) Date: Apr. 26, 2016

(87) PCT Pub. No.: WO2015/064323
PCT Pub. Date: May 7, 2015

(65) Prior Publication Data
US 2016/0257864 A1 Sep. 8, 2016

(30) Foreign Application Priority Data
Oct. 28, 2013 (JP) ................................ 2013-223726

(51) Int. Cl.
*C08L 63/00* (2006.01)
*C09J 163/00* (2006.01)
(Continued)

(52) U.S. Cl.
CPC ............ *C09J 163/00* (2013.01); *C08G 59/66* (2013.01); *C08J 3/241* (2013.01); *C08K 9/10* (2013.01); *C08L 33/08* (2013.01)

(58) Field of Classification Search
CPC ......... C09J 163/00; C08G 59/66; C08J 3/241; C08K 9/10; C08L 33/08
(Continued)

(56) References Cited

U.S. PATENT DOCUMENTS 4,406,816 A * 9/1983 Sliwka ..................... B01J 13/18
264/4.33
4,409,156 A 10/1983 Hoshi et al.
(Continued)

FOREIGN PATENT DOCUMENTS

| CN | 102352209 A * | 2/2012 | ............ C09J 163/00 |
| JP | 56-51238 A | 5/1981 | |

(Continued)

OTHER PUBLICATIONS

Yuan et al., CN 102352209 A machine translation in English, Feb. 15, 2012.*

(Continued)

*Primary Examiner* — David T Karst
(74) *Attorney, Agent, or Firm* — Westerman, Hattori, Daniels & Adrian, LLP

(57) ABSTRACT

A microcapsule-type curable resin composition enables the mass production of microcapsules each encapsulating a curing agent and therefore can be produced at significantly low cost, and which has an excellent adhesion property and excellent storage stability. Particularly, a microcapsule-type curable resin composition can exhibit excellent low-temperature curability and an excellent curing rate when used for a screw member such as a screw and can exhibit a significantly superior effect when used for preventing the looseness of screws. A microcapsule-type curable resin composition includes microcapsules each encapsulating (a) a compound having at least three thiol groups; (b) a substance capable of being cured by reacting with the com- (Continued)

pound having at least three thiol groups; and (c) a binder capable of adhering the microcapsules to a material of interest. The curable resin composition can be used preferably for the adhesion of a screw member.

3 Claims, 4 Drawing Sheets

(51) Int. Cl.
  *C08G 59/66* (2006.01)
  *C08K 9/10* (2006.01)
  *C08J 3/24* (2006.01)
  *C08L 33/08* (2006.01)
(58) Field of Classification Search
  USPC .................................. 523/400; 525/523, 451
  See application file for complete search history.

(56) References Cited

U.S. PATENT DOCUMENTS

| | | | | |
|---|---|---|---|---|
| 2004/0258922 | A1* | 12/2004 | Willett | C08G 59/188 428/418 |
| 2006/0083928 | A1* | 4/2006 | Miyagawa | C08F 279/02 428/413 |
| 2010/0292415 | A1* | 11/2010 | Reynolds | C08G 59/24 525/533 |
| 2012/0201628 | A1* | 8/2012 | Wrobel | C08F 265/02 411/82.2 |

FOREIGN PATENT DOCUMENTS

| | | |
|---|---|---|
| JP | 60-257442 A | 12/1985 |
| JP | 5-140514 A | 6/1993 |
| JP | 7-304968 A | 11/1995 |
| JP | 8-239452 A | 9/1996 |
| JP | 9-31162 A | 2/1997 |
| JP | 2000-204263 A | 7/2000 |
| JP | 2001-135927 | 5/2001 |
| JP | 2002-69416 A | 3/2002 |
| JP | 2003-194032 A | 7/2003 |
| JP | 2007-127202 A | 5/2007 |
| JP | 2009-209209 A | 9/2009 |
| WO | 2005/054393 A1 | 6/2005 |

OTHER PUBLICATIONS

International Search Report dated Jan. 6, 2015, issued in counterpart International Application No. PCT/JP2014/077001 (2 pages).

* cited by examiner

MICROCAPSULE TYPE CURABLE RESIN COMPOSITION

TECHNICAL FIELD

The present invention relates to a microcapsule type curable resin composition, and more particularly relates to a microcapsule type curable resin composition, for example, used for bonding, locking etc. a threaded member (a screw-type fastening fixture) such as screw.

BACKGROUND ART

Conventionally, a microcapsule type adhesive for adhering a threaded member such as screw, bolt, nut and machine screw is widely known. For example, the microcapsule type adhesive includes a microcapsule type adhesive for locking comprising (A) a microcapsule comprising epoxy resin as a core material and aldehyde-based resin or urea-based resin as a wall material, (B) a binder comprising water-soluble polyacetal resin and (C) a nonvolatile and water-soluble or water-dispersable amine-based curing agent (Patent Document 1); a microcapsule type adhesive composition comprising (A) a microcapsule comprising epoxy resin as a core material and aldehyde-based resin or urea resin as a wall material, (B) an emulsion with a pH of 6 to 13 comprising binder resin with emulsifying ability, (C) a water-soluble or water-dispersable amine-based curing agent, and (D) a hydrolytic neutralized product of a copolymer obtained from alkyl vinyl ether and maleic anhydride, or a hydrolytic neutralized product of crosslinked alkylidene of the copolymer obtained from alkyl vinyl ether and maleic anhydride (Patent Document 2); a locking agent composition in a form of an aqueous dispersion including a microcapsule type adhesive for applying to a screw-type fastening fixture containing a microcapsule with a wall material including urea-based resin, melamine-based resin, urethane-based resin, polyurea-based resin, polyamide-based resin, epoxy-based resin, or copolymer resin obtained from the two or more resins into which epoxy resin as a reactive adhesive or a mixture of epoxy resin and a reactive diluent is enclosed, and an emulsion or a dispersion in which liquid or semi-solid polyamide with a free amino group acting as a curing agent for the epoxy resin (reactive adhesive) and as a binder (binding agent) for the microcapsule is emulsified or dispersed in water or in a mixture of water and lower alkanol as an aqueous dispersion medium containing a dissolved emulsifier or dispersing agent, wherein the microcapsule is dispersed in the emulsion or the dispersion (Patent Document 3); and the like. In all these adhesives, adhesive resin such as epoxy resin is enclosed into a microcapsule to interrupt contact with a curing agent, for acquiring high preservation stability. Although this causes to some extent high preservation stability and fixing force, the preservation stability and fixing force are still not enough, so there is room for improvement.

A liquid composition for applying a thread groove is known, the composition comprising a consistent viscous liquid composition formed by uniformly dispersing a microcapsule encapsulating a lubricant in a liquid or semi-solid state at room temperature and a microcapsule encapsulating an epoxy resin-based adhesive in a liquid or semi-solid state at room temperature, in a liquid phase which is a viscous solution obtained by dissolving an elastomeric substance as a main component of a pressure sensitive adhesive and a curing agent for the epoxy resin-based adhesive into an organic solvent or a mixed solvent of a water-miscible organic solvent and water with or without addition of a tackifier, or in a liquid phase which is a viscous aqueous emulsion or a viscous aqueous dispersion obtained by dispersing the elastomeric substance and the curing agent in water or an aqueous medium with or without addition of the tackifier (Patent Document 4). In Patent Document 4, it is described that polyamide and polythiol can be used as the curing agent for the epoxy resin-based adhesive. Furthermore, in the liquid composition for applying a thread groove described in Patent Document 4, the curing agent is required to have consistency as well as action for curing by reaction with the epoxy resin. Due to the consistency, the liquid composition will achieve various effects by adhering the microcapsule encapsulating the lubricant and the microcapsule encapsulating the epoxy resin-based adhesive to an adherend well without being dried out and generating a solid powder chip after applying and drying the liquid composition for applying a thread groove to a screw. Therefore, the curing agent must exhibit the consistency between the above microcapsules and the adherend, so the liquid composition for applying a thread groove cannot achieve the above effects by encapsulating the curing agent into the microcapsule. For this reason, in Patent Document 4, there is not a technical idea of encapsulating the curing agent into the microcapsule. Furthermore, in Patent Document 4, it is not described that the curing agent can be encapsulated into the microcapsule.

A microcapsule type curing agent essentially comprising (A) a curing agent for thermosetting resin and (B) thermoplastic resin which is heat dissoluble into the thermosetting resin, wherein the component (A) is a particle coated with a layer containing the component (B) as a main component and an average particle diameter thereof is 0.1 to 20 µm, is disclosed (Patent Document 5). The thermosetting resin includes epoxy resin, cyanate ester resin, maleimide resin, and resin obtained by preliminary reaction of cyanate ester resin and maleimide resin, and the curing agent for the thermosetting resin includes aliphatic amine, alicyclic amine, aromatic amine, polyamide, an urea compound, an imidazole compound, a guanidine compound, a hydrazide compound, an acid anhydride, a Lewis acid complex, a phenolic compound and a mercaptan compound. The invention provides a thermosetting resin composition which can exhibit good preservation stability at room temperature and excellent heat resistance of a cured article, and a microcapsule type curing agent for providing a prepreg. In Patent Document 5, although the mercaptan compound is included in a great number of the substances listed as the curing agent, there is not an example in which a microcapsule type curing agent containing the mercaptan compound is used.

A photosensitive microcapsule is known, the microcapsule comprising a wall forming substance which encapsulates an internal phase including a photosensitive composition, the photosensitive composition being able to be cured by free-radical initiated addition polymerization or crosslinking, and the photosensitive microcapsule encapsulating polythiol (Patent Document 6). The photosensitive microcapsule contains the photosensitive composition and polythiol in a capsule. In Tables A to E shown as examples, polythiol, namely trimethylol propane tris (β-mercapto propionate) (TMPTMP) and pentaerythritol tetrakis (β-mercapto propionate) (PTEMP), is encapsulated into the capsule in addition to trimethylol propane triacrylate (TMPTA), a diallyl o-phthalate prepolymer (DAPP) and bisphenol A epoxy resin (DER662). For example, in C-3 of Table C, trimethylol propane triacrylate and bisphenol A epoxy resin are encapsulated into the microcapsule with polythiol, namely trimethylol propane tris (β-mercapto propionate). Thereby, action effect as the photosensitive composition, for example film velocity, is improved.

PRIOR ART DOCUMENTS

Patent Documents

[Patent Document 1] JP-Hei-05-140514 A
[Patent Document 2] WO 2005/054393
[Patent Document 3] JP 2003-194032 A
[Patent Document 4] JP 2007-127202 A
[Patent Document 5] JP-Hei-07-304968 A
[Patent Document 6] JP-Sho-60-257442 A

SUMMARY OF INVENTION

Technical Problem

The present invention provides a microcapsule type curable resin composition with excellent fixing force and preservation stability which can be manufactured at a remarkably low cost because a microcapsule encapsulating a curing agent can be mass-produced. Particularly, the present invention provides a microcapsule type curable resin composition which has excellent low-temperature curability and curing velocity when applied to a threaded member such as screw and which achieves remarkably good effects when used for locking the screw.

Solution to Problem

To the various curing agents for the epoxy resin as described in Patent Document 5, such as aliphatic amine, alicyclic amine, aromatic amine, polyamide, an urea compound, an imidazole compound, a guanidine compound, a hydrazide compound, an acid anhydride, a Lewis acid complex, a phenolic compound, a mercaptan compound and the like, the inventors repeatedly performed trial of encapsulating the substance into a microcapsule (microencapsulating test). However, among all the curing agents, there is no difference in difficulty of encapsulating. So, the inventors advanced the study in more detail and thereby found that a compound with 3 or more thiol groups (mercaptan compound) can be more easily microencapsulated than the other compounds, particularly the amine compounds. In addition, it was found that, among the compounds with the thiol group, the compound with 3 or more thiol groups, particularly a compound with 3 to 4 thiol groups, can be more easily encapsulated in comparison with the case where a compound with less than 3 thiol groups is used. Furthermore, it was found that, when the compound with 3 or more thiol groups, preferably the compound with 3 to 4 thiol groups, is encapsulated into the microcapsule, extremely excellent fixing force and preservation stability can be imparted to a microcapsule type curable resin composition, so the present invention was led to completion. The reason why the compound can be easily encapsulated may be that, in manufacture of the capsule, the thiol compound as an encapsulated substance is reacted with a substance constituting shell of the microcapsule at a capsule interface to form structure like thin skin of an egg, so, when the thin skin is formed, the compound with 3 or more thiol groups can form minute structure, particularly the compound with 3 to 4 thiol groups can form more minute structure, to make the obtained capsule remarkably strong. Furthermore, it is generally known that the thiol compound is excellent in low-temperature curability and quick curability as the curing agent for epoxy resin, so the microcapsule type curable resin composition according to the present invention can achieve quick cure of a screw by utilizing the characteristics.

That is, the present invention is (1) a microcapsule type curable resin composition comprising: a microcapsule encapsulating a compound with 3 or more thiol groups (a); a substance (b) curable by reacting with the compound with 3 or more thiol groups; and a binder (c) which can adhere the microcapsule to an adherend.

Preferable aspects can include:

(2) the microcapsule type curable resin composition according to (1), wherein the component (a) is a compound with 3 to 5 thiol groups;

(3) the microcapsule type curable resin composition according to (1), wherein the component (a) is a compound with 3 or 4 thiol groups;

(4) the microcapsule type curable resin composition according to (1), wherein the component (a) is a compound with 4 thiol groups;

(5) the microcapsule type curable resin composition according to any one of (1) to (4), wherein the component (b) is selected from a group consisting of epoxy resin and phenoxy resin;

(6) the microcapsule type curable resin composition according to any one of (1) to (4), wherein the component (b) is bisphenol type epoxy resin;

(7) the microcapsule type curable resin composition according to any one of (1) to (6), wherein the component (b) is encapsulated in a microcapsule separate from that encapsulating the component (a);

(8) the microcapsule type curable resin composition according to any one of (1) to (7), wherein the component (c) is an emulsion containing a (meth)acrylate ester (co) polymer;

(9) the microcapsule type curable resin composition according to any one of (1) to (8), wherein a wall of the microcapsule encapsulating the component (a) is constituted of urea-based resin;

(10) the microcapsule type curable resin composition according to any one of (1) to (8), wherein the wall of the microcapsule encapsulating the component (a) is constituted of a reaction product of melamine and polyvalent acid;

(11) the microcapsule type curable resin composition according to any one of (1) to (10), wherein content of the component (c) is 10 to 60 parts by mass per 100 parts by mass of the microcapsule;

(12) the microcapsule type curable resin composition according to any one of (1) to (10), wherein the content of the component (c) is 20 to 50 parts by mass per 100 parts by mass of the microcapsule;

(13) the microcapsule type curable resin composition according to any one of (7) to (12), wherein content of the microcapsule encapsulating the component (a) is 20 to 80 parts by mass per 100 parts by mass of the microcapsule encapsulating the component (b);

(14) the microcapsule type curable resin composition according to any one of (7) to (12), wherein the content of the microcapsule encapsulating the component (a) is 35 to 65 parts by mass per 100 parts by mass of the microcapsule encapsulating the component (b);

(15) the microcapsule type curable resin composition according to any one of (1) to (14), wherein the adherend is a threaded member; and

(16) a method for fixing a threaded member comprising applying the microcapsule type curable resin composition according to any one of (1) to (15) to the threaded member; and screwing the member.

Advantageous Effects of Invention

In the microcapsule type curable resin composition according to the present invention, by using the compound with 3 or more thiol groups (a) as the curing agent, the microcapsule encapsulating the curing agent can be easily mass-produced, so the microcapsule type curable resin composition can be manufactured at a remarkably low cost. Furthermore, by enclosing the above component (a) into the microcapsule, the microcapsule type curable resin composition has excellent fixing force and preservation stability.

DESCRIPTION OF EMBODIMENTS

Figure 1:
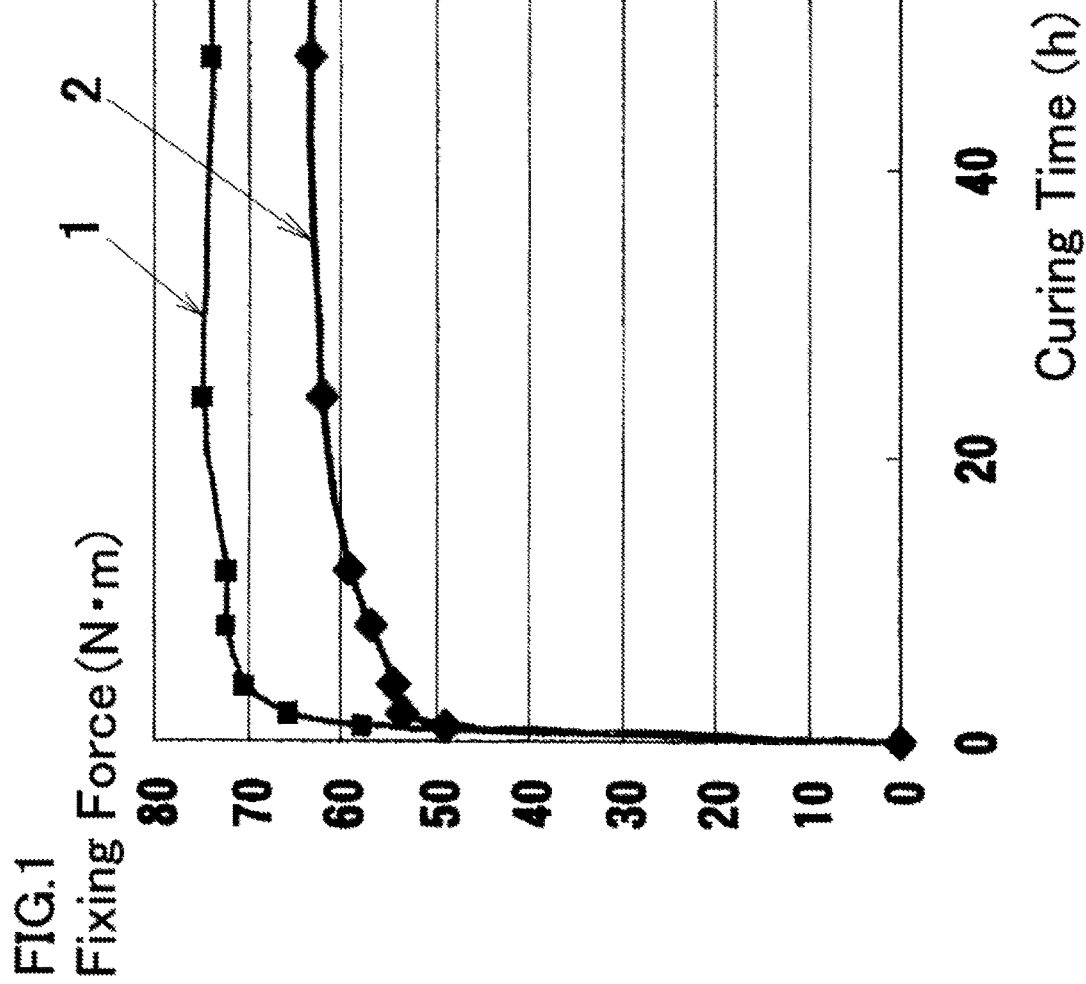
FIG. 1 is a graph showing chronological change of adhesive strength (fixing force) of precoated bolts when the bolts are kept in an environment of atmospheric pressure and temperature: 25±1° C.

The microcapsule type curable resin composition according to the present invention comprises a microcapsule encapsulating (a) a compound with 3 or more thiol groups; (b) a substance curable by reacting with (a) the above compound with 3 or more thiol groups; and (c) a binder which can adhere the microcapsule to an adherend.

In the compound with 3 or more thiol groups (a), the number of the thiol groups is preferably 3 to 5, more preferably 3 or 4, further preferably 4. If the number is less than the above lower limit, sufficient fixing force is not obtained and further the microencapsulation may be hindered. Whereas if the number is more than the above upper limit, remarkable increase of the effects is not observed and further a cost is increased. The component (a) is not particularly limited as far as the thiol group is matched with the above number, so a commercial product can be used. The commercial product includes, for example, pentaerythritol tetrakis (3-mercapto butyrate) [the number of thiol groups: 4, Karenz MT PE1 (trademark) made by Showa Denko K.K.], pentaerythritol tetrakis (3-mercapto propanoate) [the number of thiol groups: 4, jERCURE QX40 (trademark) made by Mitsubishi Chemical Corporation], trimethylol propane tris (3-mercapto butyrate) [the number of thiol groups: 3, Karenz MT TPMB (trademark) made by Showa Denko K.K.], trimethylol ethane tris (3-mercapto butyrate) [the number of thiol groups: 3, Karenz MT TEMB (trademark) made by Showa Denko K.K.], and 1,3,5-tris (3-mercapto butyloxyethyl)-1,3,5-triazine-2,4,6(1H,3H,5H)-trione [the number of thiol groups: 3, Karenz MT NR1 (trademark) made by Showa Denko K.K.].

The compound with 3 or more thiol groups (a) is contained in the microcapsule. Thereby, direct contact of the component (a) with (b) the substance curable by reacting with the component (a) can be avoided and preservation stability of the microcapsule type curable resin composition can be ensured. A substance constituting a microcapsule wall preferably includes urea-based resin, melamine-based resin such as a polycondensate of methylol melamine and a reaction product of melamine and polyvalent acid, polyurea-based resin, polyurethane-based resin, polyamide-based resin and the like. An average particle diameter of the microcapsule is preferably 10 to 100 µm, more preferably 25 to 85 µm. The average particle diameter is determined as follows. First, an arbitrarily extracted capsule is photographed with a scanning electron microscope to measure the particle diameter. Then, the measurement is repeated for 100 capsules to determine their average value as the average particle diameter. If the particle diameter is less than the above lower limit, since total surface area of the particles is increased, each capsule wall is thinned and stability of the capsule itself is reduced, due to the fixed amount of the substance constituting the microcapsule wall, so storage stability of the microcapsule type curable resin composition may get worse. Whereas if the particle diameter is more than the above upper limit, strength of the capsule wall film is reduced, so uniform cure of the above resin composition may be prevented.

In a mass ratio of the component (a) and the above substance constituting the microcapsule wall, the substance constituting the microcapsule wall is preferably 0.05 to 0.5, more preferably 0.1 to 0.4 with respect to 1.0 of the component (a). If the substance is less than the above lower limit, the capsule wall is too thinned, so stability of the capsule is reduced and encapsulation is difficult. In addition, the storage stability of the microcapsule type curable resin composition may get worse. Whereas if the substance is more than the above upper limit, a wall material is too thickened, for example the capsule may not be sufficiently broken in being screwed, so cure may not immediately proceed.

The microcapsule encapsulating the compound with 3 or more thiol groups (a) can be manufactured using a known method. For example, it can be manufactured using a method described in JP-Sho-53-84881 A and JP 2000-015087 A, namely a method for manufacturing a microcapsule comprising preparing an aqueous dispersion containing methylol melamine, salt of an isobutylene-maleic anhydride copolymer, and the compound with 3 or more thiol groups (a); and polycondensing the methylol melamine in the aqueous dispersion under an acidic condition. The methylol melamine used as a raw material of melamine resin constituting the microcapsule wall is a precondensate of melamine and formaldehyde, which can be manufactured from melamine and formaldehyde according to a conventional method. A commercial product can be also used as the methylol melamine. Furthermore, the isobutylene-maleic anhydride copolymer can be manufactured using isobutylene and maleic anhydride according to a conventional method. For example, it can be manufactured by charging these monomers into a reaction vessel and then solution-copolymerizing the monomers with an initiator of radical polymerization. Since the isobutylene-maleic anhydride copolymer has an acid anhydride group in a molecule, the acid anhydride group is reacted with a basic substance to form water-solubilized salt. In the method, the isobutylene-maleic anhydride copolymer is used in a state of the water-solubilized salt. The basic substance includes, for example, sodium hydroxide, potassium hydroxide and the like. Furthermore, in place of the isobutylene-maleic anhydride copolymer, ethylene-maleic anhydride copolymer, methyl vinyl ether-maleic anhydride copolymer, propylene-maleic anhydride copolymer, butadiene-maleic anhydride copolymer, vinyl acetate-maleic anhydride copolymer, or the like can be also used. In the present invention, although molecular weight of the above maleic anhydride-based copolymer is not limited, weight average molecular weight is preferably within a range of 50,000 to 250,000, more preferably within a range of around 100,000 to 200,000.

Next, the above method for manufacturing a microcapsule will be described in more detail. At first, an aqueous dispersion containing the compound with 3 or more thiol groups (a) and the salt of the isobutylene-maleic anhydride copolymer is prepared. Then, after adjusting pH of the aqueous dispersion to an acidic side if necessary, the methylol melamine is added to the aqueous dispersion before polycondensing the methylol melamine while keeping at predetermined temperature under agitation to prepare water dispersed slurry of the microcapsule encapsulating the compound with 3 or more thiol groups (a).

pH of the aqueous dispersion containing the compound with 3 or more thiol groups (a) and the salt of the isobutylene-maleic anhydride copolymer is preferably 5 or less, more preferably 2 to 4.5. Although temperature while preparing the aqueous dispersion is not particularly limited, it is preferably 10 to 80° C., more preferably 15 to 50° C. The preparation of the aqueous dispersion can be performed using a known device such as homogenizer. The salt of the isobutylene-maleic anhydride copolymer is used preferably by 5 to 25 parts by mass, more preferably by 10 to 15 parts by mass, as solid contents based on 100 parts by mass of the compound with 3 or more thiol groups (a).

The temperature while polycondensing the methylol melamine is preferably 30° C. or more, more preferably 40 to 70° C., and reaction time is preferably 3 hours or less. Although the pH while polycondensing the methylol melamine is not particularly limited as far as it is on the acidic side, 2.5 to 5.0 is preferable. From a viewpoint of reaction velocity and strength of the capsule wall of the obtained microcapsule, 3.0 to 4.0 is more preferable. Although the step of polycondensing the methylol melamine is generally performed only by adding the methylol melamine to the aqueous dispersion prepared in the preceding step, the PH can be adjusted to the above range using sodium hydroxide, potassium hydroxide, or the like.

From the slurry of the microcapsule obtained as above, the microcapsule is separated by filtration, centrifugal separation, or the like. Then, the obtained microcapsule is washed with water before drying with an air dryer or the like to obtain an aggregate of the microcapsules. In this way, a spherical microcapsule with the above average particle diameter can be obtained. Furthermore, the nearly total amount of the component (a) used when manufacturing the microcapsule can be encapsulated in the microcapsule.

The component (b) the substance curable by reacting with the compound with 3 or more thiol groups (a) preferably includes epoxy resin, phenoxy resin, an oxetane compound, an acrylic compound and the like. Among the substances, epoxy resin is more preferable, bisphenol type epoxy resin is particularly preferable. The component (b) is preferably encapsulated in a microcapsule separate from that encapsulating the component (a). The preservation stability can be further enhanced by encapsulating the components (a) and (b) in the separate microcapsules, respectively. A method for manufacturing the microcapsule encapsulating the component (b), as well as a substance constituting a microcapsule wall, a particle diameter of the microcapsule, a mass ratio of the component (b) and the substance constituting the microcapsule wall, and the like are similar to those of the above component (a). Furthermore, the nearly total amount of the component (b) used when manufacturing the microcapsule can be encapsulated in the microcapsule similar to the above case of the component (a).

A kind of the component (c), i.e., the binder which can adhere the microcapsule to an adherend is not particularly limited as far as the binder forms a film after drying, and can adhere the microcapsule to the adherend, preferably a threaded member. Furthermore, the binder can also adhere other components except the microcapsule to the adherend. The microcapsule is not limited to the microcapsule encapsulating the component (a) and includes the microcapsule when the component (b) is microencapsulated. The binder includes, for example, (meth)acryl-based resin, urethane-based resin, butadiene-based resin, vinyl acetate-based resin and the like. In general, these binders are used in the form of an emulsion. A commercial product of the binder includes, for example, Newcoat KSB-1 (trademark, acryl-based; pH=8, made by Shin-Nakamura Chemical Co., Ltd.), VONCOAT DC-118 (trademark, acryl-based; pH=8, made by Dainippon Ink & Chemicals, Inc.), Lacstar DA-401 (trademark, butadiene-based; pH=8, made by Dainippon Ink & Chemicals, Inc.), VONDIC 1530 (trademark, urethane-based; pH=8, made by Dainippon Ink & Chemicals, Inc.) and the like. In the emulsion containing the (meth)acryl-based resin, a (meth)acryl-based (co)polymer obtained by emulsion polymerization, for example a (meth)acrylate ester (co) polymer, is dispersed in water. In general, in the emulsion polymerization step for the resin emulsion, an electrolyte substance is added to an aqueous medium to control a particle diameter. An acrylate ester monomer used in the emulsion polymerization step is homopolymerized with itself to form an acrylate ester homopolymer, and is copolymerized with a wide range of monomer, for example, methacrylate ester, vinyl acetate, styrene, acrylonitrile, acrylic acid, or the like to form a stable emulsion. The emulsion containing the vinyl acetate resin can be manufactured by an emulsion polymerization step in which a vinyl acetate monomer is continually added while heating and agitating an emulsifier, or protective colloid, an initiator of polymerization, a neutralizer aqueous solution. The vinyl acetate monomer can be homopolymerized with itself, and can be copolymerized with various monomers, for example acrylate ester, maleate ester, fumarate ester, fatty acid vinyl ester, ethylene, or the like. There are various methods for manufacturing the emulsion containing the urethane-based resin. In a phase inversion emulsification method, the emulsion is manufactured by reacting isocyanate with a polyol component to prepare a polyurethane resin with a hydroxyl group on the end, and then by diluting the resin with a solvent such as toluene and dropping an emulsifier aqueous solution into the diluted resin before agitating to emulsify the same. In a blocked isocyanate method, the emulsion is manufactured by treating a prepolymer with an isocyanate group on the end, which is obtained by reaction of excessive equivalent of isocyanate with a polyol component, by the use of a blocking agent such as ketoximes and phenols to block the isocyanate group on the end, and then by dropping an emulsifier aqueous solution into the blocked prepolymer before agitating to emulsify the same. In a prepolymer method, the emulsion is manufactured by using an emulsifier to mechanically emulsify a prepolymer with an isocyanate group on the end in water, and by using a chain extender to react the emulsified prepolymer at a particle interface for polymerization. In a self emulsification method, the emulsion is manufactured by introducing a polar group into a polymer to make the polymer a self emulsification type, without using an emulsifier. pH of the emulsion prepared with the binder resin is preferably 5 to 13, more preferably 6 to 10. If the pH is lower than 5, an emulsified and dispersed state of the binder is changed so that the binder is remarkably thickened and may not be applied to an adherend. Whereas if the pH is more than 13, influence such as corrosion on a metal component is concerned.

An upper limit of content of the above component (a) in the microcapsule type curable resin composition according to the present invention is preferably 80 parts by mass, more preferably 65 parts by mass, further preferably 50 parts by mass, and a lower limit is preferably 20 parts by mass, more preferably 25 parts by mass, further preferably 35 parts by mass per 100 parts by mass of the component (b). If the content of the component (a) is more than the above upper limit, remarkable increase of an effect on curability of the component (b) is not observed, further leading to reduction of a thermal fixing property. Whereas if the content is less than the above lower limit, the component (b) may not be sufficiently cured. Furthermore, an upper limit of content of the component (c) is preferably 60 parts by mass, more preferably 50 parts by mass, and a lower limit is preferably 10 parts by mass, more preferably 20 parts by mass per 100 parts by mass of the microcapsule. Microcapsule mass is total mass of the microcapsule encapsulating the component (a) and the microcapsule encapsulating the component (b). If the content is more than the above upper limit, remarkable increase of the effect for adhering the microcapsule to an adherend is not observed, rather leading to a high cost, whereas if the content is less than the above lower limit, the microcapsule may not be sufficiently adhered to an adherend.

If necessary, in addition to the above respective components, various additives can be added to the microcapsule type curable resin composition according to the present invention as long as not preventing the effect of the present invention. The additive can include, for example: a reaction catalyst for the components (a) and (b) such as polyamine; a filler such as silica, nylon powder, alumina, talc, calcium carbonate, mica and kaolin; an organic or inorganic pigment such as carbon black, titanium oxide and a phthalocyanine compound; dye; a plasticizer; a surfactant; a deforming agent; and the like. Furthermore, water can be also added to the microcapsule type curable resin composition comprising the above respective components to set to suitable concentration. Among the components, (e) the filler is preferably contained for application of screwing a threaded member such as screw. As the filler, silica, talc, mica, fluororesin powder, nylon resin powder, polyethylene resin powder, acrylic resin powder, glass particulate powder, metal oxide particulate powder, or the like can be used. Particularly, silica and/or nylon resin powder with an average particle diameter of 1 to 50 μm is preferably used due to effective prevention of galling of the threaded member.

A method for manufacturing the microcapsule type curable resin composition according to the present invention by blending the above respective components is not particularly limited, so a known method can be used. For example, silica powder and/or nylon resin powder, and titanium oxide as the pigment are added to ion-exchange water before agitating. Then, while agitation is maintained after adding (c) the binder, the microcapsule encapsulating the component (a) and the component (b) or the microcapsule encapsulating the component (b) are added and agitated into a uniform state so that the capsule is not broken, and thereby the microcapsule type curable resin composition according to the present invention can be manufactured.

Although the present invention will be described in more detail in the following Examples, the present invention is not limited to the Examples.

EXAMPLES

Substances

Each component used in the Examples and the Comparative Examples is as follows:

<Component (a): Compound with 3 or More Thiol Groups>

(i) Pentaerythritol tetrakis-3-mercapto propanoate [the number of thiol groups: 4, jERCURE QX40 (trademark) made by Mitsubishi Chemical Corporation]

(ii) 1,3,5-tris (3-mercapto butyloxyethyl)-1,3,5-triazine-2,4,6(1H,3H,5H)-trione [the number of thiol groups: 3, Karenz MT NR1 (trademark) made by Showa Denko K.K.]

<Comparative Component (a)>

(i) 1,4-bis (3-mercapto butyryloxy) butane [the number of thiol groups: 2, Karenz MT BD1 (trademark) made by Showa Denko K.K.]

(ii) 1,3-di-4-piperidylpropane [Beckopox EH623 (trademark) made by Hoechst AG]

<Component (b): Substance Curable by Reacting with the Compound with 3 or More Thiol Groups (a)>

(i) Bisphenol F type epoxy resin [jER807 (trademark) made by Mitsubishi Chemical Corporation]

(ii) Glycidyl amine type epoxy resin [jER604 (trademark) made by Mitsubishi Chemical Corporation]

<Component (c): Binder>

(i) Acrylic resin emulsion [an emulsion containing 44.8% by mass acrylate ester copolymer and 55% by mass water, and the balance surfactant; Newcoat KSB-1 (trademark) made by Shin-Nakamura Chemical Co., Ltd.]

(ii) Polyacetal [KW10 (trademark) made by Sekisui Chemical Co., Ltd.]

(iii) Styrene-butadiene-based rubber latex [JSR0589 (trademark) made by JSR Corporation]

Other Components

<Component (d): Catalyst>

(i) Tris(dimethylaminomethyl) phenol [Alcamine K-54 (trademark) made by Air Products and Chemicals, Inc]

<Component (e): Filler>

(i) Silica [diatomaceous earth; average particle diameter: 3 μm; SNOW FLOSS (trademark) made by Celite Corporation]

(ii) Nylon 11 powder [average particle diameter: 40 μm; Rilsan D-40 (trademark) made by Arkema SA], <Others>

Distilled Water

Physical Properties

Each physical property of the Examples and the Comparative Examples was measured as follows.

<Adhesive Strength (Fixing Force)>

A precoated bolt was fastened to a nut with fastening torque of 30.0 N m, and then stored for 24 hours in an environment of atmospheric pressure and temperature: 25±1° C. to measure breaking torque of the precoated bolt. In the measurement, the 5 precoated bolts were measured in increments of 5 N m every predetermined time at the above temperature to adopt a center value of measurements. The breaking torque is the adhesive strength (fixing force) (N m). Zinc-plated chromate treated hexagon head bolts (JIS Level 2 M10*20P1.5) were used for the test, where the compositions of the respective Examples and Comparative Examples described in Table 1 are uniformly applied to a surface of the bolts and then dried in a hot air drying furnace at 80° C. for 20 minutes to obtain test objects. On the other hand, a nut, which was similarly subjected to zinc-plated chromate treatment and which can fit to the hexagon head bolt, was used.

<Adhesive Strength after Preservation (Preservation Stability)>

A precoated bolt was fastened to a nut with fastening torque of 30.0 N m, and then stored for 24 hours in an environment of atmospheric pressure and temperature: 25±1° C. Next, the fastened bolts were stored for 7 days, 14 days, 21 days and 28 days in an environment of atmospheric pressure, temperature: 40±1° C. and relative humidity: 95%, and then breaking torque of the precoated bolts was measured in an environment of atmospheric pressure and temperature: 25±1° C., respectively. In the measurement, the 5 precoated bolts were measured after storing for 24 hours in the environment of atmospheric pressure and temperature: 25±1° C. and after storing for the respective days in the environment of atmospheric pressure, temperature: 40±1° C. and relative humidity: 95% to adopt an average value of measurements. The breaking torque is the adhesive strength after preservation (N m). The bolts and the nuts used for the test have the same specification as those in the above measurement of adhesive strength (fixing force).

<Pressure Resistance>

Figure 3:
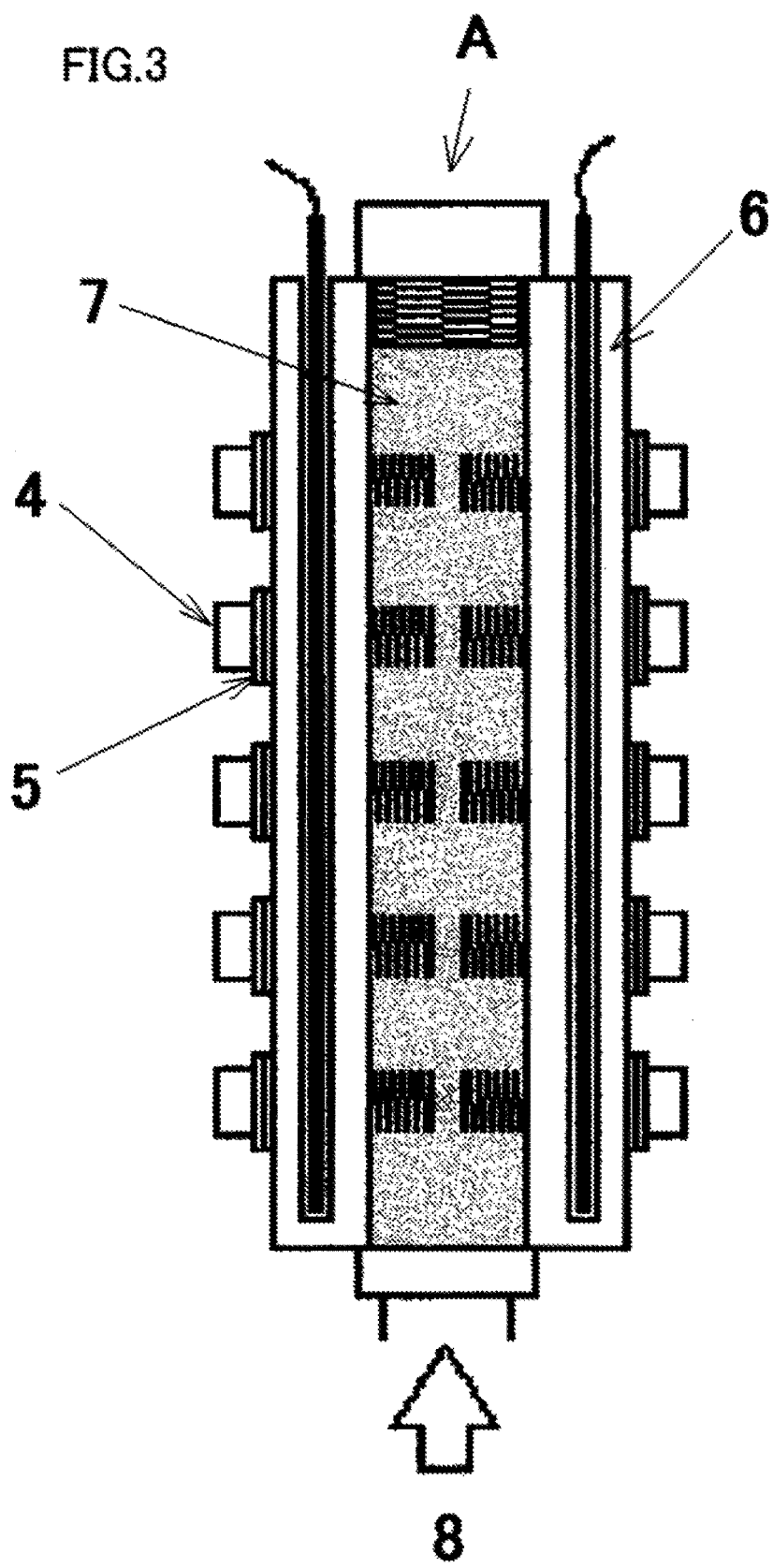
FIG. 3 is a partial sectional view schematically showing a seal testing block to which precoated bolts are fastened.
Figure 4:
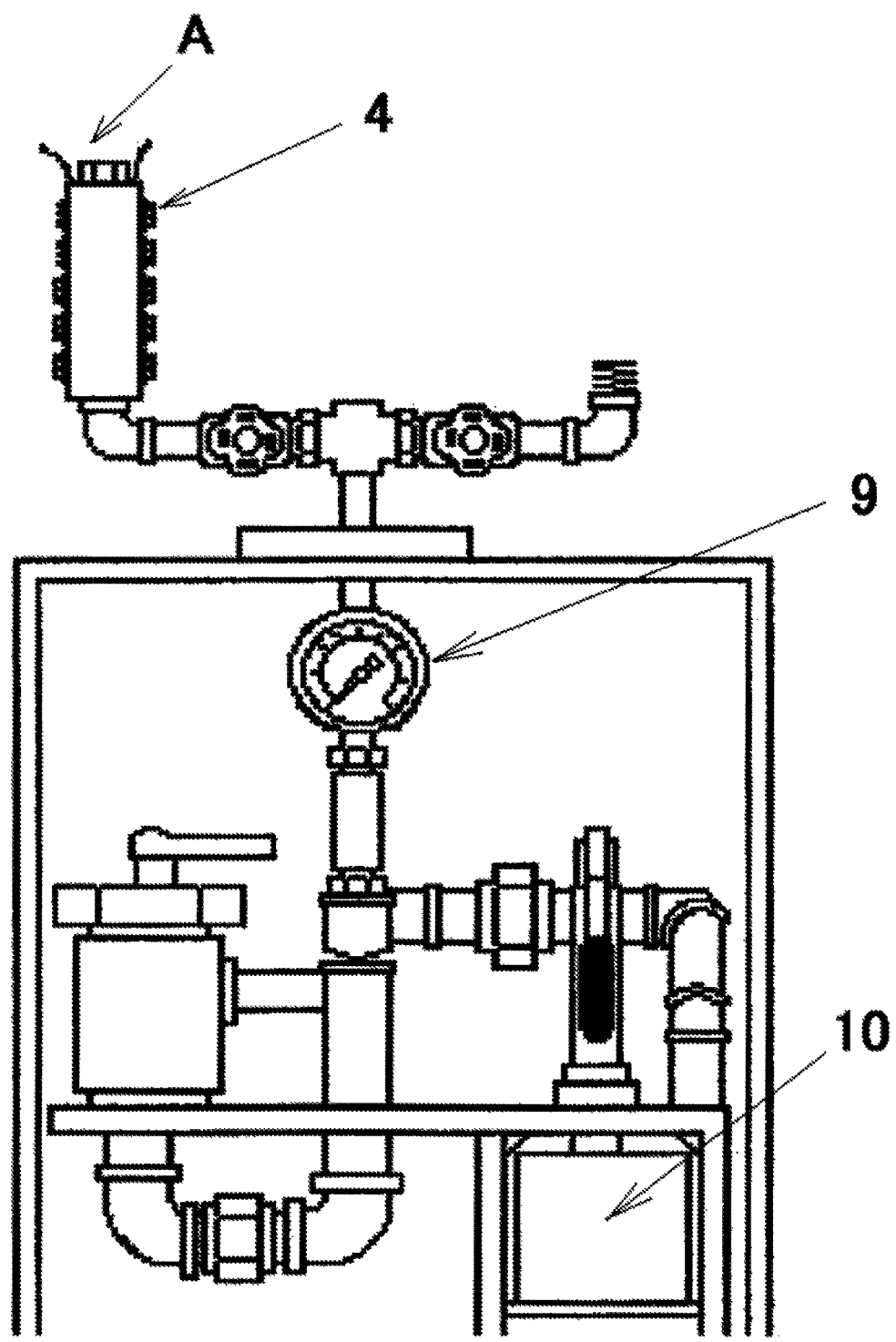
FIG. 4 is a schematic view of a seal testing machine used for a pressure resistance test.

The precoated bolts made in the Examples and the Comparative Examples were used. As shown in FIG. 3, the 10 precoated bolts were fastened to a seal testing block made of aluminum with fastening torque of 30.0 N m using two washers for the one precoated bolt, respectively, and then left for 24 hours at 25° C. for cure. Next, turbine oil (RIX turbine oil made by Japan Energy Corporation) was filled into the seal testing block, and then the block was set to a seal testing machine shown in FIG. 4. Thereafter, the block was pressurized by hydraulic pressure to 12.0 MPa from an arrow direction shown in FIG. 3 before keeping for 2 minutes to visually observe presence of leakage. The above pressure resistance test was performed while keeping both the seal testing block and the turbine oil filled into the seal testing block at 170° C. Evaluation results are as shown by the following signs.

G: The number of bolts in which leakage of the oil was observed is 0 among the 10 bolts.

B: The number of bolts in which leakage of the oil was observed is 1 or more among the 10 bolts.

<Appearance of Film>

Using JIS Level 2 zinc-plated chromate treated hexagon head bolts as specimens, application liquids, namely the compositions of the respective Examples and Comparative Examples shown in Table 1, were applied to a screw portion of the bolts by soaking only the screw portion of the bolts in the application liquid for 2 to 3 seconds before pulling up. The bolts were dried in a thermostatic chamber for 20 minutes at 80° C. to obtain samples for film appearance measurement (precoated bolts). Then, applied states of the application liquids on the samples for the film appearance measurement were visually determined to evaluate applying properties. Evaluation results are indicated by the following signs.

G: The application liquid is uniformly and homogenously applied to the screw portion of the bolt.

B: The application liquid is not uniformly applied to the screw portion of the bolt, irregularity and unevenness are observed on film thickness, and a pinhole may be observed.

<Curing End Time>

Adhesive strength was measured in the same way as the above adhesive strength (fixing force). However, from a sample which is not stored in an environment of atmospheric pressure and temperature: 25±1° C. (storage time: 0 hour) to a sample which is stored up to for 24 hours (storage time: 24 hours) in the environment, adhesive strength was measured on the samples per storage time of an hour. By comparing an adhesive strength value with a previous adhesive strength value, storage time until difference between the values became less than 5% was determined as the curing end time. Evaluation results are indicated by the following signs.

G: The curing end time is storage time of 24 hours or less.

B: The curing end time is storage time of more than 24 hours.

Example 1

Preparation of a Microcapsule Encapsulating the Component (a)

Pentaerythritol tetrakis-3-mercapto propanoate (the number of thiol groups: 4) was used as the component (a). On the other hand, a methylol melamine precondensate (BECKAMINE M-3 made by DIC Corporation, concentration: 80%) was used as a microcapsule wall material.

12 grams of an isobutylene-maleic anhydride copolymer [Isobam 110 (trademark) made by KURARAY CO., LTD.] was added to 30 grams of water before heating to 40° C. under agitation in a pressurized container, and then an aqueous solution of 10% tartaric acid was dropped into the container to adjust pH to a range within 3.0 to 4.0. Next, 125 grams of the component (a) pentaerythritol tetrakis-3-mercapto propanoate was added to the aqueous solution before agitating at room temperature to prepare an aqueous dispersion. In this step, agitation time and agitation velocity can be adequately regulated to manufacture a microcapsule with the following predetermined particle diameter. Then, 200 grams of water was added to the aqueous dispersion before heating to 50 to 70° C. under agitation. Thereafter, 50 grams of an aqueous solution obtained by diluting the above methylol melamine precondensate as the microcapsule wall material with ion-exchange water (containing 25 grams of the methylol melamine precondensate) was added to the above aqueous dispersion before agitating and then polycondensated while heating to 90° C. under agitation. After 2 to 3 hours had passed, the solution was neutralized by adding an aqueous solution of 28% ammonia to finish the reaction, so slurry of the microcapsule was obtained. Next, the slurry of the microcapsule was dehydrated in a centrifugal dehydrator before drying to obtain an aggregate of the microcapsules. An average particle diameter of the obtained microcapsules was 55±10 µm.

Preparation of a Microcapsule Encapsulating the Component (b)

100 grams of an isobutylene-maleic anhydride copolymer [Isobam 04 (trademark) made by KURARAY CO., LTD.] and 10.4 grams of sodium hydroxide were added to 625.6 grams of ion-exchange water before agitating for 4 hours at 110° C. in a pressurized container to obtain an aqueous solution with pH of 2.9. Next, after adding 100 grams of the aqueous solution to 270 grams of ion-exchange water, 184.8 grams of the above component (b) bisphenol F type epoxy resin was added before agitating at room temperature to prepare an aqueous dispersion. Then, 110 grams of ion-exchange water and 32.1 grams of a methylol melamine prepolymer [Sumirez Resin 615 (trademark) made by Sumitomo Chemical Co., Ltd.] as a microcapsule wall material were added to the above aqueous dispersion before polycondensating for 2 to 3 hours while heating to 90° C. under agitation to obtain slurry of the microcapsule. Thereafter, the slurry of the microcapsule was dehydrated in a centrifugal dehydrator before drying to obtain an aggregate of the microcapsules. An average particle diameter of the obtained microcapsules was 50 µm.

Preparation of the Microcapsule Type Curable Resin Composition

Each substance shown in Table 1 was used by each parts by mass shown in Table 1. Remaining components except the microcapsule encapsulating the component (a), the microcapsule encapsulating the component (b), and the component (c) the binder were added to distilled water before agitating under an ambient temperature for 30 minutes until the solution became uniform. After adding the component (c) the binder to the solution under agitation, the microcapsule encapsulating the component (a) and the microcapsule encapsulating the component (b) were added before agitating under an ambient temperature for 30 minutes until the solution became uniform, and thereby the microcapsule type curable resin composition was manufactured.

Manufacture of the Precoated Bolt

The precoated bolt was manufactured by the same method as the above sample for the film appearance measurement. Using the precoated bolt, the above various physical properties were evaluated.

Example 2

The preparations were performed in the same way as Example 1 except that the microcapsule encapsulating the component (a) was prepared using 1,3,5-tris (3-mercapto butyloxyethyl)-1,3,5-triazine-2,4,6(1H,3H,5H)-trione (the number of thiol groups: 3) as the component (a). Using the obtained microcapsule type curable resin composition and precoated bolt, the various physical properties were evaluated.

Example 3

The preparations were performed in the same way as Example 1 except that the microcapsule type curable resin composition was manufactured using pentaerythritol tetrakis-3-mercapto propanoate (the number of thiol groups: 4) as the component (a) by 25 parts by mass. Using the obtained microcapsule type curable resin composition and precoated bolt, the various physical properties were evaluated.

Example 4

The preparations were performed in the same way as Example 1 except that the microcapsule type curable resin composition was manufactured using pentaerythritol tetrakis-3-mercapto propanoate (the number of thiol groups: 4) as the component (a) by 75 parts by mass. Using the obtained microcapsule type curable resin composition and precoated bolt, the various physical properties were evaluated.

Example 5

The preparations were performed in the same way as Example 1 except that the microcapsule encapsulating the component (b) was prepared using glycidyl amine type epoxy resin as the component (b). Using the obtained microcapsule type curable resin composition and precoated bolt, the various physical properties were evaluated.

Example 6

The preparations were performed in the same way as Example 1 except that the microcapsule type curable resin composition was manufactured using polyacetal as the component (c). Using the obtained microcapsule type curable resin composition and precoated bolt, the various physical properties were evaluated.

Example 7

The preparations were performed in the same way as Example 1 except that the microcapsule type curable resin composition was manufactured using styrene-butadiene-based rubber latex as the component (c). Using the obtained microcapsule type curable resin composition and precoated bolt, the various physical properties were evaluated.

Comparative Example 1

The microcapsule was prepared in the same way as Example 1 except that the comparative component (a)-(i), namely 1,4-bis (3-mercapto butyryloxy) butane (the number of thiol groups: 2), was used in place of the component (a). Using the obtained microcapsule type curable resin composition and precoated bolt, the various physical properties were evaluated. Furthermore, it was observed that the microcapsule prepared as described above was sticky. So, when the component (b) the bisphenol type epoxy resin was mixed to the microcapsule, the mixture was gelatinized and increase in viscosity was observed within 24 hours after mixing. It is considered that reaction between the comparative component (a) and the component (b) the bisphenol type epoxy resin was generated. Therefore, it was found that, if the comparative component (a) was used, the microencapsulation was incomplete.

Comparative Example 2

The microcapsule was prepared using the comparative component (a)-(ii), namely 1,3-di-4-piperidylpropane, in place of the component (a). However, the substance was dissolved into water in the capsule preparing step, so the microcapsule was not able to be prepared. Thus, using the substance without microencapsulation, the various evaluations were performed. As a result, the mixture was gelatinized and increase in viscosity was observed, similar to Comparative Example 1. It was confirmed that reaction was uncontrolled due to the unencapsulation of the curing agent component.

Comparative Example 3

The preparations were performed in the same way as Example 1 except that the microcapsule type curable resin composition was manufactured using pentaerythritol tetrakis-3-mercapto propanoate (the number of thiol groups: 4) as the component (a) by 15 parts by mass. Using the obtained microcapsule type curable resin composition and precoated bolt, the various physical properties were evaluated.

Comparative Example 4

The preparations were performed in the same way as Example 1 except that the microcapsule type curable resin composition was manufactured using pentaerythritol tetrakis-3-mercapto propanoate (the number of thiol groups: 4) as the component (a) by 90 parts by mass. Using the obtained microcapsule type curable resin composition and precoated bolt, the various physical properties were evaluated.

Comparative Example 5

The preparations were performed in the same way as Example 1 except that the microcapsule type curable resin composition was manufactured without using the acrylic resin emulsion as the component (c). Using the obtained microcapsule type curable resin composition and precoated bolt, the various physical properties were evaluated.

The kinds and mass of the components used in the Examples and the Comparative Examples, and physical properties of the compositions are shown in the following Table 1. The numerical values in each component are indicated in units of parts by mass. Furthermore, the numerical values in the components (a) and (b) are indicated in units of parts by mass of the microcapsule encapsulating either of the components (a) and (b).

TABLE 1

| Composition | Examples |  |  |  |  |  |  | Comparative Examples |  |  |  |  |
|---|---|---|---|---|---|---|---|---|---|---|---|---|
|  | 1 | 2 | 3 | 4 | 5 | 6 | 7 | 1 | 2 | 3 | 4 | 5 |
| Component (a) |  |  |  |  |  |  |  |  |  |  |  |  |
| (i)QX40 | 50 | — | 25 | 75 | 50 | 50 | 50 | — | — | 15 | 90 | 50 |
| (ii)NR1 | — | 50 | — | — | — | — | — | — | — | — | — | — |
| Comparative component (a) |  |  |  |  |  |  |  |  |  |  |  |  |
| (i)BD1 | — | — | — | — | — | — | — | 50 | — | — | — | — |
| (ii)EH623 | — | — | — | — | — | — | — | — | 40*2 | — | — | — |
| Component (b) |  |  |  |  |  |  |  |  |  |  |  |  |
| (i)jER807 | 100 | 100 | 100 | 100 | — | 100 | 100 | 100 | 100 | 100 | 100 | 100 |
| (ii)jER604 | — | — | — | — | 100 | — | — | — | — | — | — | — |
| Component (c) |  |  |  |  |  |  |  |  |  |  |  |  |
| (i)KSB-1 | 50 | 50 | 50 | 50 | 50 | — | — | 50 | 50 | 50 | 50 | — |
| (ii)KW10 | — | — | — | — | — | 50 | — | — | — | — | — | — |
| (iii)JSR0589 | — | — | — | — | — | — | 50 | — | — | — | — | — |
| Component (d) |  |  |  |  |  |  |  |  |  |  |  |  |
| K-54 | 10 | 10 | 10 | 10 | 10 | 10 | 10 | 10 | 10 | 10 | 10 | 10 |
| Component (e) |  |  |  |  |  |  |  |  |  |  |  |  |
| (i)SNOW FLOSS | 50 | 50 | 50 | 50 | 50 | 50 | 50 | 50 | 50 | 50 | 50 | 50 |
| (ii)Rilsan D-40 | 100 | 100 | 100 | 100 | 100 | 100 | 100 | 100 | 100 | 100 | 100 | 100 |
| Distilled water | 500 | 500 | 500 | 500 | 500 | 500 | 500 | 500 | 500 | 500 | 500 | 500 |
| Evaluation results |  |  |  |  |  |  |  |  |  |  |  |  |
| Adhesive strength (Fixing force) | 70 | 60 | 70 | 70 | 60 | 60 | 70 | 30 or less | 30 or less | 35 | 40 | 30 or less |
| Adhesive strength after preservation (Preservation stability) | 65 | 55 | 60 | 60 | 55 | 60 | 60 | 30 or less | 30 or less | 30 or less | 30 | 30 or less |
| Pressure resistance | G | G | G | G | G | G | G | B | B | B | G | B |
| Appearance of film | G | G | G | G | G | G | G | B | B | B | B | B |
| Curing end time | G | G | G | G | G | G | G | —*1 | —*1 | B | G | G |

*1 in the above Table 1 represents "unmeasured".
*2 represents "microencapsulation was not able to be performed".
Furthermore, the abbreviations in each component are as follows.
QX4O: Pentaerythritol tetrakis-3-mercaptopropanoate
NR1: 1,3,5-tris (3-mercapto butyloxyethyl)-1,3,5-triazine-2,4,6(1H,3H,5H)-trione
BD1: 1,4-bis (3-mercapto butyryloxy) butane
EH623: 1,3-di-4-piperidylpropane
jER807: Bisphenol F type epoxy resin
jER604: Glycidyl amine type epoxy resin
KSB-1: Acrylic resin emulsion
KW10: Polyacetal
JSR0589: Styrene-butadiene-based lubber latex
K-54: Tris(dimethylaminomethyl) phenol
SNOW FLOSS: Silica
Rilsan D-40: Nylon 11 powder In Examples 1, 3 and 4, (i) pentaerythritol tetrakis-3-mercaptopropanoate was used as the component (a) in the varied blending amount. Substantially regardless of the variation in the blending amount, all the evaluation results are remarkably good in all the Examples. In Example 2, (ii) 1,3,5-tris (3-mercapto butyloxyethyl)-1,3,5-triazine-2,4,6 (1H,3H,5H)-trione was used as the component (a). Although the adhesive strength (fixing force) and the adhesive strength after preservation (preservation stability) are slightly reduced in comparison with Example 1, the good results are shown. In Example 5, (ii) the glycidyl amine type epoxy resin was used as the component (b). Although the adhesive strength (fixing force) and the adhesive strength after preservation (preservation stability) are slightly reduced in comparison with Example 1, the good results are also shown. In Examples 6 and 7, polyacetal and styrene-butadiene-based rubber latex were used as the component (c), respectively.

Figure 2:
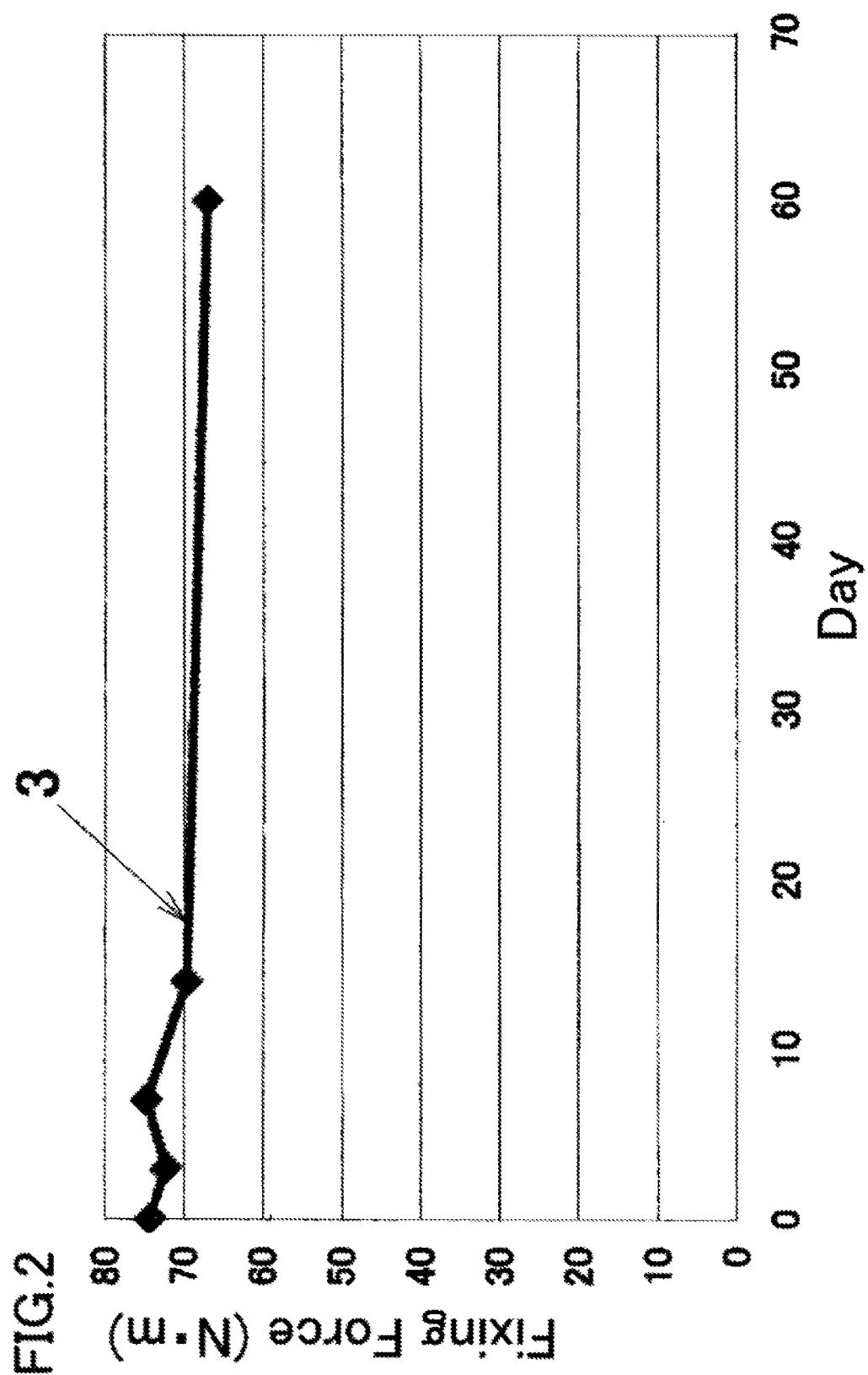
FIG. 2 is a graph showing chronological change of adhesive strength after preservation (preservation stability) of the precoated bolt when the bolt is kept in an environment of atmospheric pressure, temperature: 40±1° C., and relative humidity: 95%.

Although the adhesive strength (fixing force) and the adhesive strength after preservation (preservation stability) are slightly reduced in comparison with Example 1, the good results are also shown. FIG. 1 shows chronological change of the adhesive strength (fixing force) when the compositions of Examples 1 and 2 are used. FIG. 2 shows change of the adhesive strength (fixing force) after long time passage when the composition of Example 1 is used. As can be seen from FIG. 1, the adhesive strength (fixing force) is substantially fixed at the high values within the several curing time. Furthermore, as can be seen from FIG. 2, the adhesive strength (fixing force) can be maintained at the substantially fixed value without being reduced even after the long time passage.

On the other hand, in Comparative Example 1, (i) 1,4-bis (3-mercapto butyryloxy) butane (the number of thiol groups: 2) was used as the comparative component (a) in place of the component (a). It was found that, if the comparative component (a) was used, the microencapsulation was incomplete. As a result, the reaction progressed when the composition was applied to the hexagon head bolt, so the evaluation results such as adhesive strength (fixing force) got remarkably worse. Therefore, the compound with 2 thiol groups was not able to provide the effects according to the present invention. In Comparative Example 2, (ii) 1,3-di-4-piperidylpropane was used as the comparative component (a) in place of the component (a). When the comparative component (a) was used, the microcapsule was not able to be prepared. Therefore, in Comparative Example 2, the comparative component (a) was used without microencapsulation. Similar to Comparative Example 1, the reaction progressed when the composition was applied to the hexagon head bolt, so the evaluation results such as adhesive strength (fixing force) got remarkably worse. In Comparative Examples 3 and 4, the component (a) was blended in a remarkably few amount or a remarkably large amount, respectively. In both the cases, the evaluation results got worse and the compositions were not able to provide the effects according to the present invention. In Comparative example 5, the component (c) was not blended. A stick property of the microcapsule to the hexagon head bolt got worse, and large parts of an applied film containing the microcapsule were peeled off when the bolt was fastened. Therefore, the evaluation results got worse and the composition was not able to provide the effects according to the present invention.

INDUSTRIAL APPLICABILITY

The microcapsule type curable resin composition according to the present invention is of remarkably low cost because a microcapsule encapsulating a curing agent can be mass-produced, and has excellent fixing force and preservation stability. Therefore, it is expected to be highly used not only for the general adhesive application but for locking a threaded member such as screw in the future.

REFERENCE NUMERALS

A Seal testing machine (bolt attaching portion)
1 Adhesive strength (fixing force) change curve (25±1° C.) (Example 1)
2 Adhesive strength (fixing force) change curve (25±1° C.) (Example 2)
3 Adhesive strength (fixing force) change curve (40±1° C.) (Example 1)
4 Bolt
5 Washer
6 Seal testing block
7 Oil
8 Hydraulic pressure direction
9 Pressure gauge
10 Oil tank

The invention claimed is:

1. A microcapsule type curable resin composition comprising:
   a microcapsule substantially encapsulating only a compound (a), pentaerythritol tetrakis-3-mercapto propanoate;
   a substance (b), bisphenol F type epoxy resin; and
   a binder (c), an emulsion containing acrylic acid ester copolymer or polyacetal; and
   silica and/or nylon resin powder (e) with an average particle diameter of 1 to 50 µm;
   wherein the substance (b) is encapsulated in a microcapsule separate from that encapsulating the compound (a), micro capsule wall materials of both of the compound (a) and the substance (b) are formed of a methylol melamine precondensate, the average particle diameters of the microcapsules of both of the compound (a) and the substance (b) are 10 to 100 µm, content of the binder (c) is 10 to 60 parts by mass per 100 parts by mass of a total of the microcapsule substantially encapsulating only the compound (a) and the microcapsule encapsulating the substance (b), and content of the compound (a) is 20 to 80 parts by mass per 100 parts by mass of the substance (b).

2. The microcapsule type curable resin composition according to claim 1, wherein the adherend is a threaded member.

3. The microcapsule type curable resin composition according to claim 1, further comprising tris (dimethylaminomethyl) phenol (d).

* * * * *